March 3, 1942.  H. E. THOMS  2,275,096

ARTIFICIAL PLANT

Filed May 10, 1941

Herbert E. Thoms, INVENTOR

BY Victor J. Evans & Co.

ATTORNEYS

Patented Mar. 3, 1942

2,275,096

UNITED STATES PATENT OFFICE 2,275,096

ARTIFICIAL PLANT

Herbert E. Thoms, North Hollywood, Calif.

Application May 10, 1941, Serial No. 392,985

2 Claims. (Cl. 41—13)

This invention relates to artificial plants and has for an object to provide an artificial plant formed of hardware cloth of the rectangular mesh type, the plant being indestructible so that it may be used for indoor decoration without fire hazards, which will retain its shape regardless of weather and climatic conditions and which will simulate a natural plant in appearance.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification.

Figure 1:
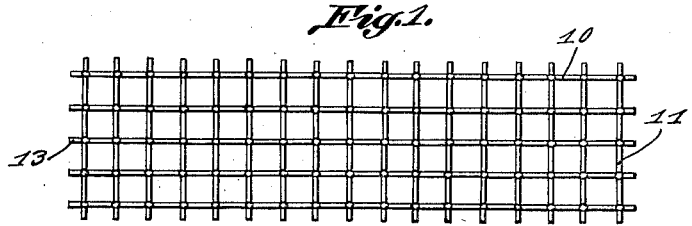
Figure 1 is a plan view of a wire mesh strip used in the first stage of constructing the artificial plant leaf.

Referring now to the drawing in which like characters of reference designate similar parts in the various views, a strip of hardware cloth of the rectangular wire mesh type is used in forming each leaf of the artificial plant, the strip comprising longitudinal wires 10 and transverse wires 11 intersecting the longitudinal wires at right angles, as shown in Figure 1.

Figure 2:
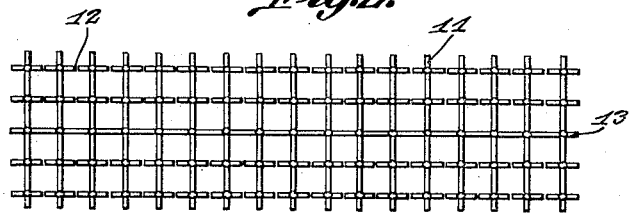
Figure 2 is a plan view showing the longitudinal wires severed between the cross wires of the mesh, this being the second stage of forming the plant leaf.

The method of forming the leaf from the oblong strip comprises severing the longitudinal wires between the transverse wires, as shown at 12, with th exception of the central longitudinal wire 13, which is left unsevered to coact in forming the stem of the leaf. This step is shown in Figure 2.

Figure 3:
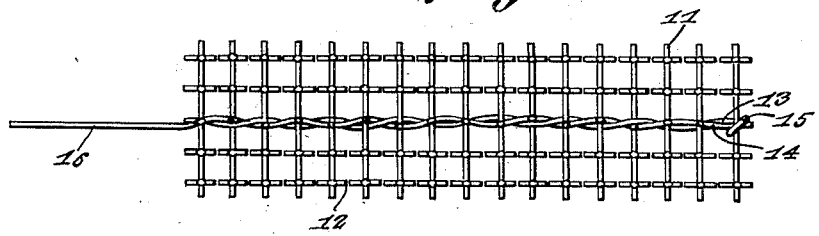
Figure 3 is a plan view showing a wire stranded on the central longitudinal wire of the wire mesh, which central longitudinal wire is left uncut, this being the third stage of forming the plant leaf.

In the next step of forming the leaf, as shown in Figure 3, a wire 14 of greater length than the central longitudinal wire 13, is stranded, that is wound in a spiral direction around the central longitudinal wire 13 and under and over respective alternate transverse wires 11. One end of the wire 14 is bent to form a hook 15, which is bent over one end portion of the central longitudinal wire at its intersection with the terminal transverse wire 11 of the strip. The free end 16 of the long wire 14 extends beyond the opposite end of the strip.

Figure 4:
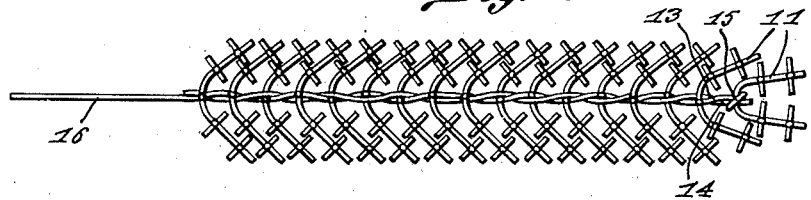
Figure 4 is a plan view showing the transverse wires of the wire mesh deformed into U-shape to nest relatively to each other to simulate the leaf while the stranded longitudinal wires simulate the stem of the leaf.
Figure 5:
Figure 5 is a front elevation of the leaves assembled with a trunk fixed in a flower pot.

As shown in Figure 4, to form the structure of the leaf, all of the transverse wires 11 are bent U-shape, the legs of successive U-shaped transverse wires increasing in their angular divergence from each other as the wires progress from the end of the central longitudinal wire 13 over which the hook 15 of the longitudinal wire is engaged, to the end of the strip from which the projecting end 16 of the longitudinal wire extends.

The leaf having thus been completed, a plurality of such leaves are assembled by securing their stems, formed by the end 16 of the longitudinal wire, together. An indestructible substantially straight length of material 17, of any preferred type to simulate the trunk of a tree, shrub or plant is secured at the upper end in any preferred manner to the stems of the leaves, and th lower end of the trunk member 17 is inserted in and secured in a piece of pottery, which may be a flower pot 18.

From the above description it is thought that the construction and operation of the invention will be fully understood without further explanation.

What is claimed is:

1. The method of forming artificial leaves consisting of severing the longitudinal wires of rectangular mesh hardware cloth between the transverse wires of the cloth, the centermost longitudinal wire being unsevered, directing a length of wire in spiral convolutions around said central wire, the said length of wire projecting beyond one end of the cloth to simulate a stem and being secured at the opposite end to the endmost transverse wire of the cloth, and deforming the transverse wires to substantially U-shape, the legs of successive U-shaped transverse wires increasing in their angular divergence from each other as the wires progress from the secured end of said length of wire toward the projecting end of said length of wire.

2. An artificial plant comprising leaves formed of hardware cloth, the longitudinal wires of which are severed between the transverse wires thereof with the exception of the centermost longitudinal wire, a wire of greater length than the cloth stranded with said centermost longitudinal wire, the transverse wires of the cloth being bent into U-form and the legs of successive U-form transverse wires increasing their angular divergence from each other as the wires progress from one end to the opposite end of the cloth, a separate length of material simulating a trunk secured to said separate length of wire at one end of the cloth, and a vessel in which said trunk simulating material is secured.

HERBERT E. THOMS.